Dec. 5, 1967     H. T. DINKELKAMP     3,356,107
TWO COMPONENT PUMPING AND PROPORTIONING SYSTEM
Original Filed April 9, 1962     5 Sheets-Sheet 5
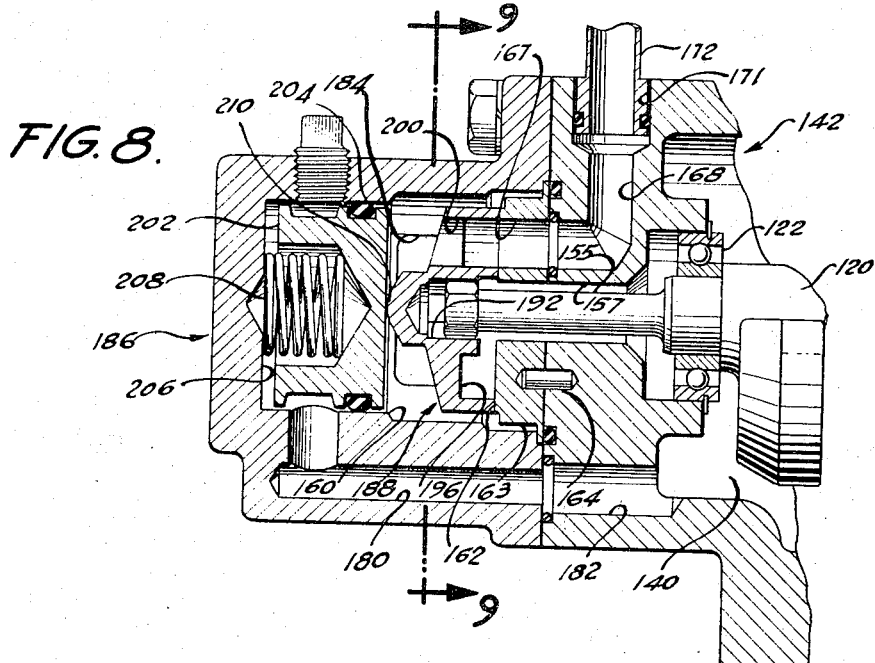
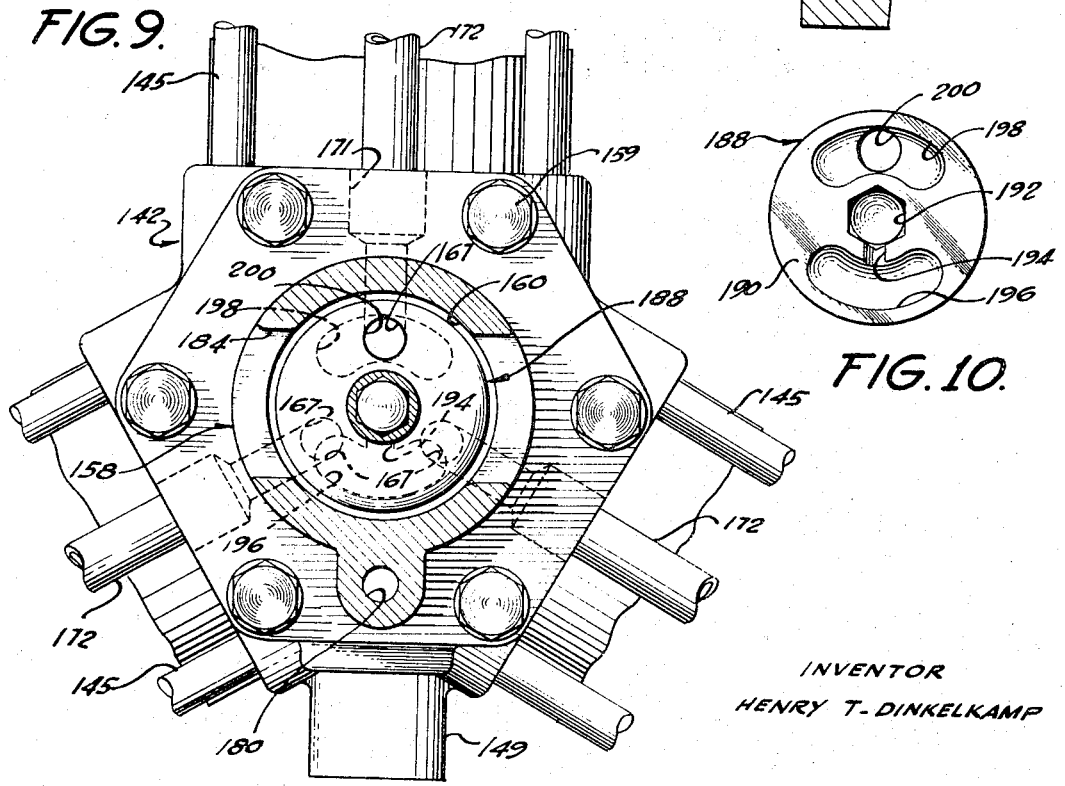
INVENTOR
HENRY T. DINKELKAMP
By *A. G. Dawas*
ATTORNEY

United States Patent Office 3,356,107
Patented Dec. 5, 1967

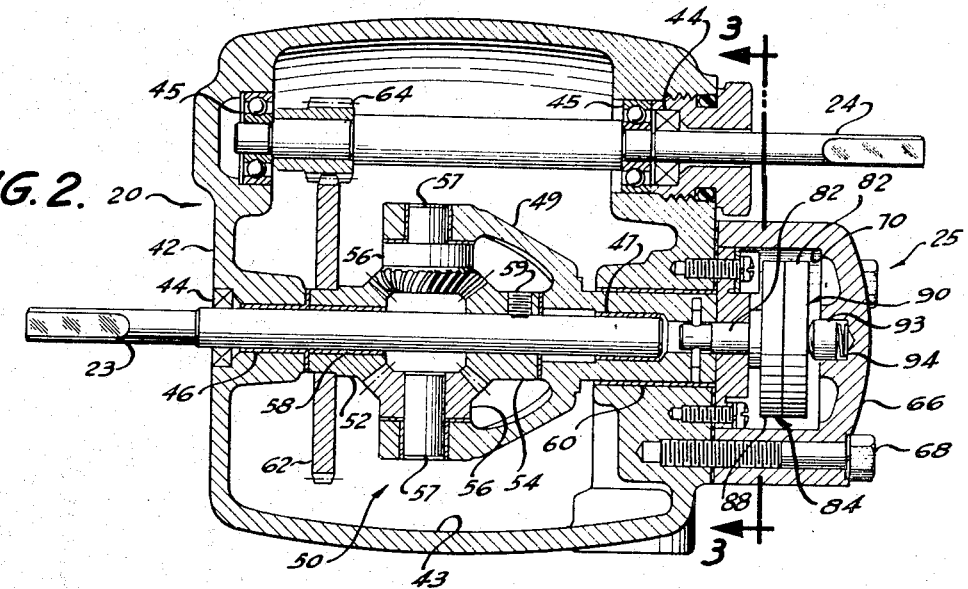
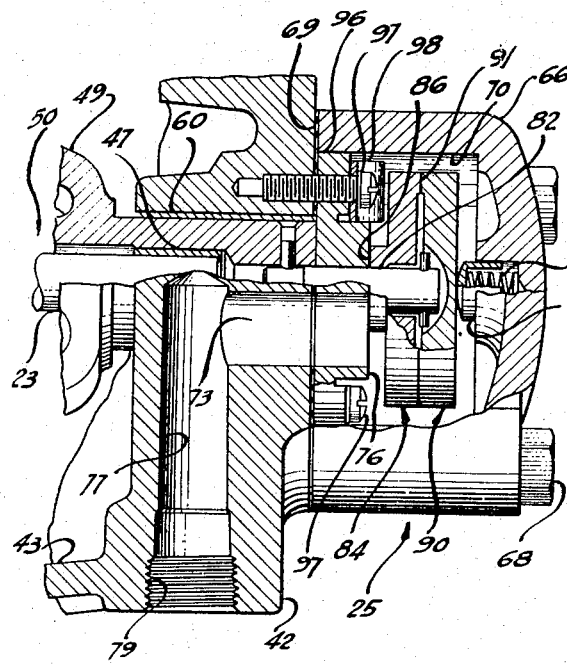
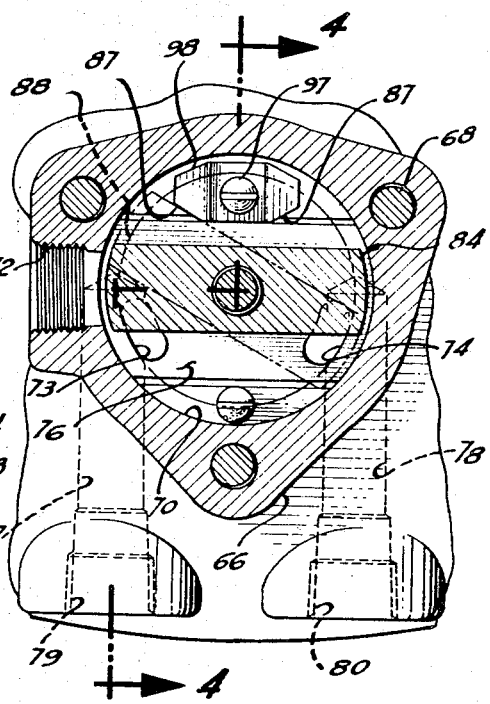
INVENTOR
HENRY T. DINKELKAMP
ATTORNEY

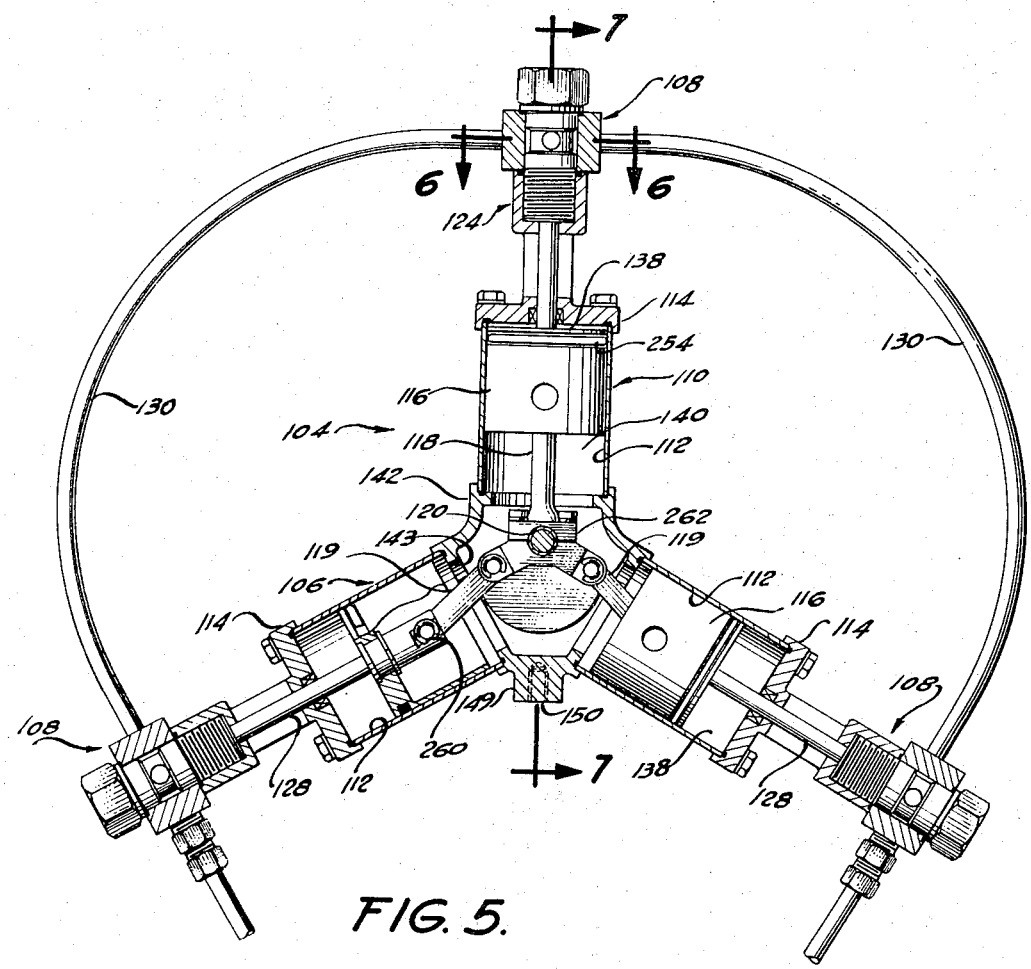

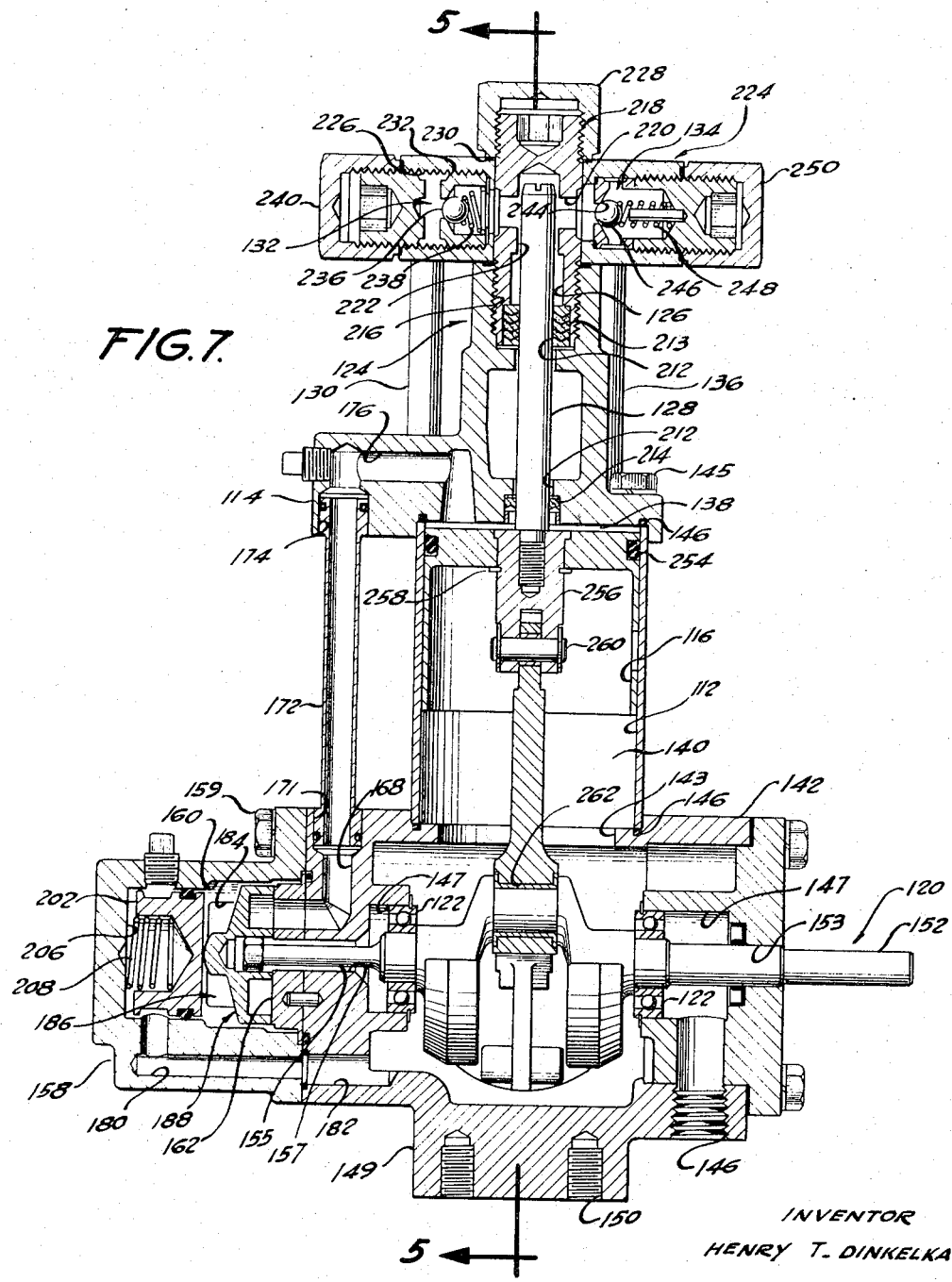

3,356,107
TWO COMPONENT PUMPING AND PROPORTIONING SYSTEM
Henry T. Dinkelkamp, Mount Prospect, Ill., assignor to Stewart-Warner Corporation, Chicago, Ill., a corporation of Virginia
Originial application Apr. 9, 1962, Ser. No. 186,188, now Patent No. 3,223,040, dated Dec. 14, 1965. Divided and this application Apr. 14, 1965, Ser. No. 448,004
1 Claim. (Cl. 137—625.46)

ABSTRACT OF THE DISCLOSURE

The following specification describes a motor synchronizer in which two mechanical inputs driven by separate sources are used to drive a carrier member to a position dependent on the relative speed of the inputs. The carrier member in turn has a slip drive connection to a valve which is moved in accordance with the carrier position to control the relative power delivered to the sources for establishing desired speed ratio therebetween.

---

This application is a division of application Serial No. 186,188, filed April 9, 1962, now Patent No. 3,223,040, and relates to a system for separately pumping and continuously proportioning two liquid or viscous materials at an exact volumetric output ratio of one with respect to the other, and in particular, to such a system where the volumetric output ratio can be adjusted to any within a wide range.

Certain commercial processes and/or products, such as spraying of a plastic coating, require exact continuous pumping and proportioning of at least two liquid and/or viscous materials. A small variation from the proper proportioning ratio can result in an end product having different, undesirable, or even inoperable characteristics from those required. However, it is quite often necessary to vary the volumetric output ratio at a given stage in the operation, to another ratio for producing a different desired end product or to compensate for changing ambient conditions. Also, the materials commonly should be segregated throughout the pumping and proportioning stages, since when combined, the materials react chemically with one another. For instance, the reaction of thermosetting resins once started, cannot be stopped and results in a cured or solid state material.

Accordingly, an object of this invention is to provide an improved system for continuously pumping and proportioning two materials at an exact volumetric output ratio of one with respect to the other.

Another object of this invention is to provide an improved system for pumping and proportioning two materials separately from one another and exactly in any of a plurality of adjustable volumetric output ratios of one with respect to the other.

Another object of this invention is to provide a two component pumping and proportioning system having a separate positive displacement unit for each of the two components, the volumetric output ratio of the components to each other being in direct proportion to the operating speed ratio of the units.

Another object of this invention is to provide a control for maintaining two positive displacement units of a two component pumping and proportioning system operating exactly at a predetermined operating speed ratio of one with respect to the other, the control responding to a change above or below the desired operating speed ratio, to modulate in the opposite sense the input power ratio to the units.

Another object of this invention is to provide an improved air operated motor and positive displacement pump combination wherein the motor is integrally operated with the pump and provides directly the input power therefor.

In order that these objects can be fully appreciated reference is herein made to the accompanying drawings, wherein:

FIG. 2 is a longitudinal section view of a synchronizer used in the subject system, the view being generally through spaced input shafts of the units;

FIG. 3 is a section view as seen generally from line 3—3 of FIG. 2;

FIG. 4 is a section view as seen generally from line 4—4 of FIG. 3;

FIG. 5 is a longitudinal section view of a combination air motor and positive displacement pump used in the subject system, the view being generally through the center of the unit as seen from line 5—5 of FIG. 7;

FIG. 6 is a section view as seen generally from line 6—6 of FIG. 5;

FIG. 7 is a section view as seen generally from line 7—7 of FIG. 5;

FIG. 8 is an enlarged section view of the distributing valve assembly for the unit, the crankshaft and valve member being rotated slightly from the position shown in FIG. 7;

FIG. 9 is a section view as seen generally from line 9—9 of FIG. 8; and

FIG. 10 is an elevational view of the distributing valve member of the assembly, the view being generally from the right of FIG. 8.

Figure 1:
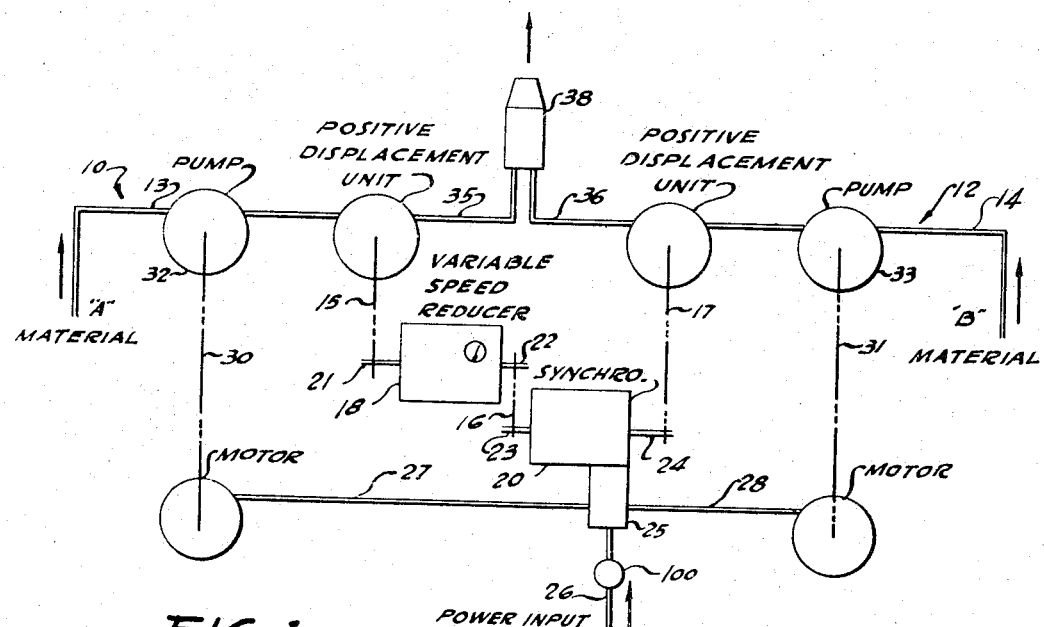
FIG. 1 is a schematic circuit of a first embodiment of the subject two component pumping and proportioning system showing the various elements and the operative arrangements thereof of the system.
Figure 1A:
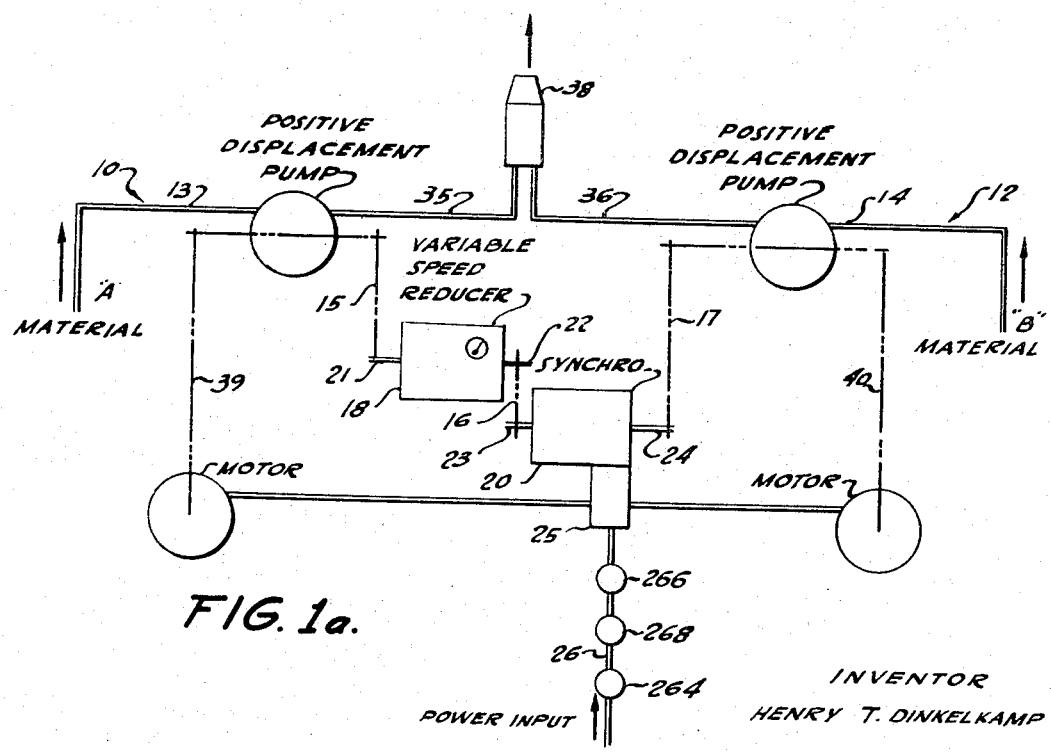
FIG. 1a is a schematic circuit of a second embodiment of the subject two component pumping and proportioning system similar in part to that shown in FIG. 1.

Referring now to FIGS. 1 and 1a, each schematic circuit of the subject pumping and proportioning systems is seen to include separate motor or pumping sections 10 and 12 for the two materials A and B. Each of the materials A and B is conveyed from a medium pressure source (not shown), such as a reservoir or the like, through lines 13 and 14 to a positive displacement unit. The materials A and B are maintained separate from one another until joined for common discharge as from the mixing nozzle 38.

A positive displacement unit in this disclosure means that class of liquid conveying devices having a volumetric output that is substantially constant for each operating cycle of the unit; independently of the operating speed of the unit or the back pressure of the material. This concept is known to be erroneous in actual use, but for practical purposes, the term is well understood in the art. Similarly, the materials operable in this system are liquids or viscous fluids considered almost incompressible under the worked pressures. Under such circumstances the volumetric output of a positive displacement unit is a function of the operating speed of the units.

The positive displacement units of the separate pumping sections 10 and 12 are interconnected mechanically as shown diagrammatically at 15, 16 and 17 through an adjustable speed reduced 18 and a synchronizer 20. The speed reducer 18 is a common variable speed reducer wherein the speed ratio of its two shafts 21 and 22 can be varied infinitely between a certain ratio. Thus for example shaft 22 can be adjusted to operate anywhere between a range of operating speeds approaching that of being stopped relative to shaft 21 or to that operating at ¼ speed of the shaft 21. The synchronizer 20 will be more fully discussed later but includes two input shafts 23 and 24 connected across a differential mechanism that operates an input power distributor 25. Any variation from a predetermined operating speed ratio of the input shafts 23 and 24 modulates the ratio of the input power directed to the separate pumping sections, 10 or 12, of the system.

The input power is directed from a source (not shown) by line 26 to the distributor 25 of the synchronizer 20 where it is split and directed through lines 27 and 28 for powering the separate pumping sections. Each section as shown in FIGS. 1 and 1a includes power receiving means such as a motor driven by the input power directed to the section. In FIG. 1 each motor is connected, as shown diagrammatically at 30 and 31, to pressure increasing means, such as any kind of dynamic pump 32 or 33 in the conveying line of the respective material. The pumps 32 and 33 force the materials through the metering positive displacement units to the discharge lines 35 and 36 and ultimately to the nozzle 38 for common discharge. In FIG. 1a, each motor is connected, as indicated diagrammatically at 39 and 40, to a positive displacement pump unit, which not only pumps the material but also proportions the material as will be noted.

In operation the volumetric output of either material A or B from its positive displacement unit is directly proportional to the operating speed of the unit. Thus by regulating the relative operating speeds or speed ratio of the positive displacement units, the volumetric output or discharge ratio can be controlled.

The speed ratio of the positive displacement units required to produce the desired volumetric material output ratio can be set by proper adjustment of the variable speed reducer 18. With the reducer 18 adjusted and the linkage from the positive displacement units to the synchronizer 20 established, the speed ratio of shafts 23 and 24 is directly a function of the operating speeds of the units. If the actual instantaneous speed ratio of the positive displacement units varies from the desired speed ratio, in one sense or the other, either above or below, the synchronizer 20 actuates the distributor 25 to modulate the input power ratio to the sections in the opposite sense. This modulation of power input ratio driving the positive displacement units inversely of the sensed deviation thereof from the desired operating speed ratio quickly returns the system to the desired ratio.

Referring now to FIGS. 2, 3 and 4, a preferred embodiment of a synchronizer 20 is shown. The synchronizer 20 includes a casing 42 which is completely closed to define an oil-tight internal chamber 43 as is typical in the gear box art. Each of the shafts 23 and 24 extends through an opening in the casing 42 and is sealed by an appropriate seal 44 to maintain the chamber 43 oil tight. As shown, shaft 24 is rotatably supported by spaced ball bearings 45, while shaft 23 is rotatable within sleeve bearings 46 and 47.

A differential unit 50 is mounted on the shaft 23 and includes a carrier member 49, opposed pinions 52 and 54, and opposed pinions 56 supported by the carrier member 49 rotatably on stub shafts 57 and engaging the pinions 52 and 54. The pinion 52 is rotatably mounted on sleeve bearing 58 relative to the shaft 23 while pinion 54 is keyed to the shaft as by set screw 59. The end of the carrier member 49 is received rotatably within sleeve bearing 60 supported by casing 42, the carrier member in turn providing the support for sleeve bearing 47. A drive gear 62 is keyed to pinion 52 in line with and engaging drive gear 64 keyed to the shaft 24.

The differential unit 50 of synchronizer 20 operates in the conventional manner wherein the carrier member 49 will rotate in either of two rotational directions at all speed ratios of input shafts 23 and 24 except that corresponding to the predetermined ratio and direction. Thus depending on the number of teeth of mating pinions 52, 54 and 56, and the number of teeth on gears 62 and 64, the predetermined speed ratio of shaft 23 to 24 will be fixed. Assuming that the pinions 52 and 54 are of equal size and that gear 62 has six times the number of teeth as gear 64, carrier member 49 will be stationary only when shaft 24 rotates in the proper direction relative to shaft 23 but at six times the speed thereof. Any deviation of the 6 to 1 speed ratio of shaft 24 to shaft 23 will cause carrier member 49 to rotate in one direction or the other, depending on whether the actual speed ratio is above or below the required speed ratio.

The distributing unit 25 of synchronizer 20 is supported by casing 42 and actuated by carrier member 49 of the differential unit 50. The unit 25 includes means by which a common source of power may be distributed in various percentages or input ratios to each section of the system. As shown in the embodiment of FIGS. 2, 3 and 4 the unit is operable to distribute an energy source such as compressed air to the units. It will be obvious to those skilled in the art that other energy means, such as electrical power or hydraulic power could be used with slight modifications of the distributor 25 as shown.

Distributor 25 includes a cup-shaped casing 66 secured by bolts 68 to the casing 42 in general alignment with the shaft 23. Gasket 69 is interposed between the periphery of casing 66 and the casing 42 to insure an airtight chamber 70 within the casing 66. A high pressure air source, such as from line 26 in FIG. 1, is communicated to the chamber 70 through inlet tap 72 (FIG. 3). The chamber 70 communicates through spaced bores 73 and 74 (FIG. 3) terminating on seating surface 76, and appropriate internal passages 77 and 78 in the casing structure to separate taps 79 and 80. The taps 79 and 80 are adapted to be connected, as by lines 27 and 28 respectively, to the separate sections 10 and 12 of the system.

A shaft 82 keyed to carrier member 49 projects into the chamber 70 through appropriate sealing bushings in the casing structure. A valve member 84 is rotatably mounted on the shaft 82 and presents valve surface 86 symmetrical of the axis of rotation complementary to seating surface 76. The profile of valve surface 86, as seen in FIG. 3, is such that in the centered position of valve member 84 with respect to the spaced terminal openings of bores 73 and 74, about ½ of each bore opening is covered by the valve surface while the remainder of each bore opening is open to the chamber 70. The valve member 84 is also rotatable on the seating surface 76 to vary the ratio of the bore openings to each other.

As shown in phantom outline in FIG. 3 the valve member 84 is in its one extreme positions abutting stop 87 wherein bore 73 is entirely open to the chamber 70 while the bore 74 is completely blocked from the chamber. The position of the valve member 84 on the seating surface 76 thus regulates the ratio of the bores open to the chamber 70. The ratio of input power distributed through each bore 73 or 74 to the separate material section is a function of the bore opening ratio of the bores exposed to the chamber 70.

The valve member 84 remote of valve surface 86 is flared to a generally cylindrical section 88 symmetrical of the axis of rotation of the valve member 84. A circular disc 90 is keyed to the end of shaft 82, as by pin received within an elongated recess, but is generally free to move axially of the shaft. The disc 90 is adjacent valve member 84 and engageable therewith on complementary annular friction surfaces 91 presented by the members extending symmetrically of shaft 82. Retainer 93 biased by spring 94 against the disc 90 maintains the friction surfaces 91 in contact and valve surface 86 seated on the seating surface 76. Also, because of the differential in areas on the opposing sides of the disc 90 and valve member 84 in the direction in line with shaft 82 a biasing force caused by the fluid pressure in the chamber 70 also maintains the disc, valve member and seating surface in snug contact. This force, it is noted, is proportional to the pressure of the fluid in the chamber.

Since disc 90 is connected to rotate with carrier member 49, motion of the carrier member is transmitted from the disc, through friction surfaces 91 to move valve member 84 on the seating surface 76. It is noted that the friction force between the friction surfaces 91 is greater than that between valve surface 86 and seating surface 76 to ensure movement of the valve member 84 directionally similar to carrier member 49. The friction clutch of surfaces 91 eliminates any damage to the structure should the carrier member override the extreme position of valve member 84 against the stop 87.

In operation, when the actual speed ratio of the shafts 23 and 24 varies either above or below the desired speed ratio, the carrier member 49 will rotate in one direction or the other. An excess sensed speed ratio of the synchronizer physically means that the input power ratio required to maintain the units synchronized also is excessive of the required input power ratio. An increasing variation in the above-mentioned synchronizer speed ratio of 6 to 1 means shaft 24 is rotating faster than six times the speed of shaft 23. Assuming counterclockwise rotation of shafts 23 and 24 (as seen from the right of FIG. 2) the carrier member 49 and the valve member 84 are rotated in the clockwise direction to change the input power ratio through bore openings 73 and 74.

The clockwise movement of the valve member 84 modulates the input power ratio in the opposite sense as is the variation from the desired speed ratio. Thus the pumping section 10 associated with the lagging shaft 23 receives more input power through increasing port opening 73, while pumping section 12 associated with the leading shaft 24 received less input power through decreasing port opening 74. Thus the input power ratio to the separate pumping sections is modulated inversely with respect to the variation of actual speed ratio from the desired speed ratio. The inverse modulation of input power ratio quickly causes any unbalanced output ratio of the system to become balanced. The synchronizer distributor 25 is continuously hunting the balanced power input ratio for the desired speed and material output ratio.

Regarding more detailed construction features of the distributor 25, it can be noted that the seating surface 76 is formed by means of a separate seat member 96 secured as by bolts 97 to the casing 42. The seat member 96 can be fabricated with appropriate center opening for the shaft 82, the spaced bores 73 and 74, and the seating surface 76; and heat treated as required. Similarly, stop 87 can be formed from a separate plate 98 secured to housing 42 as by bolt 97.

It might be emphasized here that at any instantaneous input power ratio, the position of the valve member 84 is rarely, if ever, exactly centered with respect to the spaced bore openings 73 and 74. Also, depending upon the required input power to drive each pumping section of the system to produce the desired output therefrom, the modulated input power ratio need not be the same as the desired speed and material output ratio. Nevertheless, for any deviation from the desired material output ratio the input power distributor is actuated to reverse the unbalance by modulating the input power ratio in the opposite sense from the actual sensed speed ratio deviation.

An example incorporating particular number values might be given for better understanding of the subject system. Thus, for example, the speed reducer 18 can be capable of varying the speed ratio of shaft 22 to shaft 21 between zero and ¼. Thus the shaft 22 can be held stationary with respect to shaft 21, or can be rotated at a maximum rotation of approximately ¼ that of shaft 21. Under such circumstances, the ratio of teeth of the drive gears 62 and 64 of the synchronizer might be chosen at 6 to 1.

In the arrangements of FIGS. 1 and 1a, the positive displacement unit in pumping section 10 for material A is adapted to be fast running unit as compared to that of pumping section 12 for material B. Assume that both the positive displacement units are of similar volumetric capacity and that there is no speed multiplication by lines 15, 16 and 17. For a 1 to 1 material output ratio the operating speeds of the units will be 1 to 1, as will be the operating speeds of the shafts 21 and 24. The 6 to 1 speed reduction through the synchronizer 20 requires that the speed of the shaft 23 be ⅙ that of shaft 24, correspondingly requiring that the speed of shaft 22 be ⅙ of shaft 21. The set speed ratio of shaft 22 to 21 of the speed reducer thus will be 1 to 6, well within the zero–¼ range of the reducer. At the maximum speed reducer setting of 1 to 4 ratio, the output ratio of unit 10 to unit 12 will be approximately 2 to 3; v.i., the 1 to 6 ratio across the synchronizer 20 and the 4 to 1 ratio across the speed reducer 18. With a speed reducer setting near its minimum of zero, the operating speed and output ratio of the unit of section 10 to the unit of section 12 approaches a ratio of infinity.

While the output ratio of material A to material B can theoretically approach infinity, accurate control at this ratio is not likely with actual structural elements designed for the more moderate ratios. This is believed obvious since to meet the total volumetric demand, the operating speed of one unit must be considerably above normal, while that of the other unit must be considerably below normal. In both extremes the consistency of operation diminishes. Thus the reliability of any system generally will be consistent only within a finite range of output ratios such as from 2 to 3, as above-mentioned, to perhaps 10 or 15 to 1.

It will be noted that modulation is of the inlet power and not of the pump outlet. Thus the structural elements of the system are not required to work against each other at the various ratios. In this regard an input regulator 100, such as a valve, in the input line 26 can regulate the total power input to the entire system. Thus the total input power to the synchronizer 20 can be varied to vary the total output of the entire system, while maintaining a given output ratio of material A to material B consistent.

While the embodiment of FIG. 1 shows modulation of input power to pump means operating independently of the positive displacement unit of the section, it appears desirable that the pump means and the positive displacement unit have common operation. FIG. 1a shows the alternate embodiment wherein two positive displacement pump units are connected to the drive motors, and to the synchronizer 20 and speed reducer 18 as noted. Thus the positive displacement pump unit both creates the output pressure required for each material of the system and meters the output ratio of the materials as desired.

FIGS. 5 through 10 disclose a pumping unit particularly adaptable for use in the embodiment of FIG. 1a. The unit 104 includes a radial configuration air operated motor 106 connected directly through mechanical means to separate positive displacement reciprocatable material pumps 108. The operation of the air motor and material pumps are directly interrelated with the output of the motor providing the input for the pumps.

The air motor 106 includes a frame 110 having three equally spaced radially extending cylinders 112 terminating at their outward ends at head 114. A piston 116 is snugly received within each of the cylinders 112 and is connected through master rod 118 or dummy rod 119 to a crankshaft 120 rotatably supported within the frame 110 by spaced roller bearings 122 (FIG. 7). Rotation of the crankshaft 120 reciprocates each air motor piston 116 within its cylinder 112 by twice the offset of the crankshaft as is well known in the art.

The fluid pump 108 includes a casing 124 formed in part by the head 114 and defining a pump chamber 126. A pump piston 128 secured to the air motor piston 116 is received in pump chamber 126 and adapted to reciprocate therein. The casing 124 defines material inlet and outlet means communicating with the pump chamber 126, as can be seen in FIGS. 6 and 7. The inlet line 130 communicates across inlet check 132 to the pump chamber 126 while the chamber discharges across outlet check 134 to the outlet line 136. The inlet line 130 extends between each of the separate pump units 108, as can be seen in FIG. 5, as similarly does the outlet line 136. The inlet line 130 communicates with a source of fluid connection such as through line 13 or 14 of FIG. 1a, while the outlet line 136 communicates to discharge such as lines 35 or 36.

Each air motor piston 116 is caused to reciprocate within its receiving cylinder 112 by alternately creating a differential in pressure in the airtight chambers 138 and 140 on opposite sides of the piston. Thus the piston is biased in the direction from the high pressure side to the low pressure side to rotate the crankshaft through approximately 180° of power cycle. The three pistons are out of phase by 120° relative to rotation of the crankshaft 120 to maintain power through the full 360° for continuous operation.

Upon rotation of crankshaft 120 the direct mechanical connection of each air motor piston 116 to each pump piston 128 causes a pumping stroke of the pump piston within the pump chamber 126. Since a constant volume of material is pumped during each cycle of the unit 104, output material control from the pump 108 is possible by regulating the speed ratio of two similar units 104, as has been pointed out above concerning the positive displacement units of FIG. 1.

The air motor frame 110 includes a central housing 142 having circumferentially spaced terminal openings 143 each adapted to be aligned with one of the cylinders 112. Each head 114 is secured to the housing 142 by circumferentially spaced bolts 145. Seals 146 at the periphery of the cylinder 112 mating with the head 114 and housing 142 maintain the frame 110 airtight except for the selected openings as will be mentioned subsequently. One of the openings is an inlet tap 146 formed in housing 142 and communicating with chamber 140 through bore 147. The inlet tap 146 is connected to a source of high pressure air as for instance to either of the split lines 27 or 28. The unit 104 is adapted to be secured to an approximate mounting structure (not shown) by means of the projecting lug 149 having the taped holes 150 therein.

One end 152 of crankshaft 120 projects from a sealed opening 153 to outside of the unit for connection to the speed reducer 18 or synchronizer 20, while the headed opposite end 155 of the crankshaft extends freely within an enlarged bore 157. Cup-shaped casing 158 is secured to housing 142 by bolts 159 and presents a cavity 160 in general alignment with the bore 157. Seating surface 162, defined by plate 163 secured to the housing 142 by pin 164, extends symmetrically of the axis of rotation of the crankshaft 120. The plate 163 includes a center opening therein aligned with bore 157 and three circumferentially spaced ports 167 terminating thereon equidistantly from the crankshaft end 155. Each port 167 communicates through an internal passage 168 in housing 142 with a terminal bore 171 open in a direction parallel to each cylinder 112. Conducting tube 172 received in the terminal bore 171 extends from housing 142 to an aligned terminal bore 174 in head 114. Internal passages 176 in the head 114 communicate the terminal bore 174 with the upper chamber 138 within the cylinder 112.

The casing 158 has a second bore 180 from the outward end of cavity 160 aligned with a bore 182 in housing 142 communicating with the chamber 140. The casing 158 further has vents 184 in its wall structure which communicate the cavity 160 with the outside atmosphere.

Thus far as presently described, the air motor 116 includes frame structure which is sealed to the outside except for the inlet opening 146 in the housing 142 and the vents 184 in the casing 158. The internal chamber 140 on the lower side of the pistons 116 communicates through the bore 157 and the bore 182 and passage 180 with the casing cavity 160, while the chamber 138 on the upper side of each piston 116 communicates through the passage 176, tube 172, passage 168, and the port 167 to the casing cavity 162. It is thus apparent that there is no differential in pressure in the chambers 138 and 140 since both are vented to atmosphere.

A distributing valve assembly 186 is housed within the casing cavity 160 operable to cause a sequential differential in pressure in chambers 138 and 140 on opposite sides of the pistons 116 to reciprocate each piston within its cylinder. Similarly the distributing valve assembly 186 causes the differential pressure sequentially in the various different cylinders at proper timing in order to maintain continuous operation of the unit.

The distributing valve assembly 186 includes a valve member 188 (FIG. 10) having a valve surface 190 complementarily of the seating surface 162 on seating plate 163. The valve member 188 has a center recess 192 that is hexagonal in shape and adapted to receive for keyed connection therewith the hexagonal headed end 155 of the crankshaft 120. A radial passage 194 intercommunicates the enlarged recess 192 and a circumferential slot 196 extending through an angle less than 180° relative to the recess. Another circumferential slot 198 is also formed in the valve surface 190 diametrically of slot 196 and extends through the same angle, or thereabouts, as the slot 196. A through-opening 200 in the valve member 188 communicates slot 198 with the casing cavity 160.

Piston member 202 is received within a cylindrical outward portion of the casing cavity 160 and is sealed to the periphery thereof by O-ring gasket 204 to define an airtight chamber 206. Spring 208 between the casing 158 and piston 202 biases the piston against a nosed bearing contact 210 on valve member 188 remote of its valve surface 190.

Thus it is noted that the spring 208 and piston 202 bias the valve member 188 against the seat plate 163 causing the respective surfaces 162 and 190 to seat on one another. The enlarged bore 157 from the underside chamber 140 communicates with the annular recess 192 in the valve member 188 through the radial passage 194 to the circumferential slot 196. The fluid pressure within chamber 140 also communicates through passages 180 and 182 to the airtight cylindrical chamber 206 on the outward side of the piston 202, to force the piston in the direction toward the seating surface 162. The circumferential slot 198 is vented through opening 200 to the casing cavity 160, and through vents 184 to atmosphere.

As is shown in FIG. 9, at least one of the spaced ports 167 that communicate with the chambers 138 on the upper side of each piston 116 is exposed to the slot 196, while at least one of the ports 167 communicates with the slot 198. Since slot 198 is vented to atmosphere a pressure differential is established on at least one of the pistons, the lower chamber 140 being at a higher pressure than the upper chamber 138.

Upon application of air pressure to inlet 146 in the housing 142, the compressed air acts within the entire chamber 140 against the underside of the pistons 116. The upper chamber 138 of at least one of the pistons 116 is vented through the appropriate passage means, the circular slot 198, and vents 184, thereby being under a reduced pressure relative to the chamber 140 beneath the piston. The piston thereby is forced radially outward from the crankshaft 120 which in turn moves the other interconnected pistons in the appropriate directions. The rotating valve member 188 causes a power cycle on each piston 116 on its outward stroke generally from the bottom dead center to the top dead center. The rotating valve member 188 also sequentially vents the pressure of the various chambers 138 which causes the air motor 106 to approach the torque characteristics of a 3-phase electric motor.

As is well known in the art, the valve phasing or timing with respect to each cylinder can be varied to meet the particular operating characteristics required of the unit. Thus the upper chamber 138 can be vented before, simultaneously with, or after the bottom dead center while, similarly the chamber can be pressurized before, simultaneously with, or after the top dead center. The particular desired valve phasing can be readily accomplished by varying the angular extent and relative positioning of the slots 206 and 208 of the valve member 188.

Referring now to FIGS. 5, 6 and 7, the material pump casing 124 includes the head 114 having aligned bores 212 therein for receiving the pump piston 128, with appropriate packings 213 and 214 sealing the chambers 126 and 138 from each other. The head 114 has at its upper portion a threaded bore 216 adapted to receive the lower threaded portion of a generally elongated cylinder member 218. A pair of opposed through-openings 220 formed in the cylindrical member 218 communicate with a longitudinal bore 222 and define the pump chamber 126. An elongated block member 224 having a cylindrical through-opening is received snugly over the cylinder member 218 and present threaded cross openings 226 adapted to communicate with the through openings 220 of the cylinder member. A cap 228 threaded onto an upper threaded portion of the cylinder member 218 maintains the block member 224 snug against the head 114. Seals 230 interposed between the block member 224, and the cap 228 and the head 114 prevent leakage.

The inlet and outlet checks 132 and 134, respectively, of the fluid pump are formed within the aligned cross openings 226 of the block member 224. The inlet check 132 includes an annular member 232 threaded into one of the openings 226 and having a tapered valve seat 234 against which a ball check 336 biased by spring 238 snugly engages. Cap and plug assembly 240 at the end of the opening 226 maintains a positive seal. The outlet check 136 is formed in a similar manner having an annular member 242 including a tapered seat 244 against which ball member 246 biased by spring 248 engages. A plug and cap assembly 250 threaded into the opening seals against leakage. The inlet and outlet lines 130 and 136, respectively, are formed by tubing positioned within aligned through-openings 252 and 253 in the block member 224 and communicating with the inlet and outlet chambers in the block member.

The air motor piston 116 is cup-shaped having an O-seal 254 on its outer periphery engageable with the periphery of the cylinder 112 for seating thereagainst. A cylindrical shouldered mounting member 256 is received within a counterbored opening in the head of the piston 116 and maintained in place between the shoulder and a snap ring 258. The lower end of the member 256 is provided with a cross bore for receipt therein of a wrist pin 260 for securing the upper end of the connecting rods 118 or 119, as is well known in the art. As noted above, rod 118 is the master rod having direct connection to the crankshaft through the bushing structure 262 while the rods 119 are dummy rods connected to bushing structure 262. The pump piston 128 is threaded into the mounting member 256 for integral connection to the motor piston 116 as above mentioned.

It will be noted that the air inlet through tap 146 conveys the entire quantity of air used through the air motor. Thus it is possible through appropriate oil misted air to lubricate the entire internal workings of the air motor including the bearings 122, the wrist pin construction 260 and the bushing structure 262. Additionally, the oil ladened air lubricates the cylinder and piston walls for improved friction-free movement thereof, as it does valve member 188 rotating on the seating surface 162. For this purpose and for general treatment of the input air, a water separator 264 and an air line oiler 266 are positioned within the power inlet line 26 of the embodiment of FIG. 1a. The total input power can be controlled by an air control valve 268. The oil misted air also lubricates the moving members of the distributor 25 of the synchronizer.

For each air motor piston 116 and its appropriate fluid pump piston 128, the power stroke of the cycle is caused by a differential in pressures on the underside and on the upper side of the piston 116. The power cycle biases the piston radially outward from the crankshaft thereby rotating the crankshaft and moving the other non-biased piston assemblies. When there is equal pressure in both chambers 138 and 140, a slight differential in effective areas on the opposite sides of the piston can be favored in the inward direction thereby offering a slight inward force on the piston. This further aids uniform operation of the unit 104 through the non-powered portions of the cycle.

While specific embodiments have been shown in the subject invention, it will be apparent to those skilled in the art that other modifications can be made. Thus it is desired that the invention shall be limited only by the claim hereinafter following:

What is claimed is:

In a two component proportioning system, a synchronizer for maintaining operation of two positive displacement units at a predetermined operating speed ratio, comprising in combination, a differential unit having two mechanical inputs and a carrier member interconnecting the mechanical inputs, said carrier member being stationary at only one given speed ratio and relative direction of operation of the mechanical inputs and being actuated to move in either of two opposite directions at all other speed ratios of the mechanical inputs corresponding, respectively, to an increase or decrease from the given speed ratio, a power distributor including an airtight chamber to receive a common power input of compressed air and having spaced ports to separate the common power input of compressed air between two channels, a rotatable valve member associated with said ports for rotation between two extreme positions, respectively, completely covering and completely opening one of the ports to said power distributor chamber, and a slip drive connection between said valve member and said carrier member for enabling said carrier member to actuate said valve member for varying the ratio of port openings to each other and thereby vary the ratio of power distribution to the two channels, wherein the mechanical inputs are adapted to be connected separately to the units to be driven by the units in the proper relative direction of operation, and wherein the two channels are adapted to be separately directed to the positive displacement units in such a manner that a change from a desired operating speed ratio of the units causes a change in the opposite sense in the power distribution ratio to the units.

References Cited

FOREIGN PATENTS 460,161  3/1923  Great Britain  Hejduk.

M. CARY NELSON, *Primary Examiner.*

J. R. DWELLE, *Assistant Examiner.*